(12) United States Patent
Knicker et al.

(10) Patent No.: US 12,367,256 B2
(45) Date of Patent: Jul. 22, 2025

(54) METHODS FOR DETERMINING A LIMIT OF A TOLERANCE INTERVAL, METHOD FOR EVALUATING A PRODUCTION PROCESS AND CORRESPONDING CALCULATION DEVICE

(71) Applicant: Sanofi, Paris (FR)

(72) Inventors: Florian Knicker, Frankfurt am Main (DE); Christian Reuss, Frankfurt am Main (DE); Christian Weckbacher, Frankfurt am Main (DE); Patric Ralph Stracke, Frankfurt am Main (DE)

(73) Assignee: Sanofi, Paris (FR)

( * ) Notice: Subject to any disclaimer, the term of this patent is extended or adjusted under 35 U.S.C. 154(b) by 477 days.

(21) Appl. No.: 17/612,319

(22) PCT Filed: May 25, 2020

(86) PCT No.: PCT/EP2020/064409
§ 371 (c)(1),
(2) Date: Nov. 18, 2021

(87) PCT Pub. No.: WO2020/239675
PCT Pub. Date: Dec. 3, 2020

(65) Prior Publication Data
US 2022/0244713 A1    Aug. 4, 2022

(30) Foreign Application Priority Data
May 24, 2019   (EP) .................................... 19305653

(51) Int. Cl.
*G06F 17/18* (2006.01)
(52) U.S. Cl.
CPC .... *G06F 17/18* (2013.01); *G05B 2219/32191* (2013.01)

(58) Field of Classification Search
CPC ...... G06F 17/18; G06F 18/15; G06F 11/3452; G06F 18/2193; G06F 18/2321; G06F 40/216; G06F 40/44; G05B 2219/32191
See application file for complete search history.

(56) References Cited

U.S. PATENT DOCUMENTS 7,103,470 B2    9/2006  Mintz
10,361,944 B2   7/2019  Alizadeh-Shabdiz et al.
(Continued)

FOREIGN PATENT DOCUMENTS

CN    1549069 A    11/2004
CN    103760814 A    4/2014
(Continued)

OTHER PUBLICATIONS

Uncertainty of Measurement (Year: 2012).*
(Continued)

*Primary Examiner* — Catherine T. Rastovski
*Assistant Examiner* — Sharad Timilsina
(74) *Attorney, Agent, or Firm* — Bond, Schoeneck & King, PLLC (57) ABSTRACT

Disclosed is a method for determining a limit, comprising:
providing a plurality of sample values, wherein the sample values define a sample value distribution, the sample values being values of a technical parameter related to a sample, wherein the sample items are parts of drug delivery devices, wherein the sample items are of the same construction, and wherein the technical parameter is limited by at least one technical limit value,
depending on the technical parameter and/or the sample values, choosing a probability distribution function,
using the technical limit value to determine a cutoff value for the probability distribution function,
(Continued)

specifying a probability content for the tolerance interval, and providing the limit of the tolerance interval for the technical parameter based on a transformed probability content, wherein said transformed probability content is based on the cutoff value and based on the specified probability content.

20 Claims, 3 Drawing Sheets

(56) References Cited

U.S. PATENT DOCUMENTS

| | | | |
|---|---|---|---|
| 10,361,994 | B2 | 7/2019 | Alizadeh-Shabdiz et al. |
| 2009/0299497 | A1* | 12/2009 | Luko ................ G05B 19/41875 702/181 |
| 2012/0251649 | A1 | 10/2012 | Fontana |
| 2016/0144121 | A1* | 5/2016 | Oakley ............. A61M 5/31558 604/209 |
| 2016/0246917 | A1* | 8/2016 | Otsmane ................. G06F 30/17 |
| 2017/0005801 | A1 | 1/2017 | Liu |
| 2019/0050375 | A1* | 2/2019 | Fitzgibbon .............. G06F 30/17 |
| 2019/0316902 | A1* | 10/2019 | Sparago ................... G06F 17/18 |
| 2020/0338269 | A1* | 10/2020 | Jazayeri ..................... G01L 7/00 |

FOREIGN PATENT DOCUMENTS

| | | |
|---|---|---|
| CN | 104933059 A | 9/2015 |
| FR | 3103046 A1 | 5/2021 |
| JP | 2004-523852 A | 8/2004 |
| JP | 2016-525834 A | 8/2015 |
| WO | WO 1997/001802 | 1/1997 |

OTHER PUBLICATIONS

Tolerance Interval K value (Year: 2012).*
ISO/IEC Guide 98-4:2012 (E), Uncertainty of Measurement—Part 4: Role of Measurement Uncertainty in Conformity Assessment [ JCGM 106, 2012]. (Year: 2012).*
Geometrical product specifications (GPS) Inspection by measurement of workpieces and measuring equipment—Part 1: Decision rules for proving conformance or nonconformance with specification, JIS Handbook 41 Metal Surface Treatment, 1st Edition, Japanese Standards Association (JSA), Jan. 25, 2006, 10 pages (with English abstract).
Hibbert, "Evaluation of measurement data: The role of measurement uncertainty in conformity assessment," Joint Committee for Guides in Metrology, Oct. 2012, 106:1-26.
Needle-based injection systems for medical use Requirements and test methods, Part 1: Needle injection systems, ISO 11608 1:2014(E), Third Edition, Switzerland, ISO, Dec. 15, 2014, 13 pages.
Anonymous, "Pass Sample Size Software Documentation: Tolerance Intervals," Jun. 6, 2017, retrieved on Dec. 10, 2021, retrieved from URL<"http://web.archive.org/web/20170606164451/https://www.ncss.com/software/pass/pass-documentation/#ToleranceIntervals">, 31 pages.
Anonymous, "Pass Sample Size Software Tolerance Intervals for Normal Data Introduction," Jun. 6, 2017, retrieved on Dec. 10, 2021, retrieved from URL <"https://ncss-wpengine.netdna-ssl.com/wp-content/themes/ncss/pdf/Procedures/PASS/Tolerance_Intervals_for_Normal_Data.pdf">, 9 pages.
Bredner, "Prozessfaehigkeit bei technisch begrenzten Merkmalen, Faehigkeitskennzahlen und Berechnungsmethoden," Jan. 24, 2014, retrieved on Jan. 27, 2022, retrieved from URL <https://drsteuer.de/vorlagen/Prozessfachigkeit_bei_technisch_begrenzten_Merkmalen_Jan_14.pdf>, 24 pages (with machine translation).
Bredner, "Prozessfaehigkeit bewerten, Kennzahlen fuer nomalverteilte und nicht-normalverteilte Merkmale," Inhaltsverzeichnis, Jun. 11, 2014, retrieved on Dec. 10, 2021, retrieved from URL <"http://www.drsteuer.de/vorlagen/Prozessfaehigkeit_bewerten_Nov_14.pdf">, 85 pages (with machine translation).
Bredner, "Prozessfähigkeit bewerten Kennzahlen für normalverteilte und nicht-normalverteilte Merkmale," Jan. 15, 2015, retrieved on Dec. 10, 2021, retrieved from URL <""https://www.bb-sbl.de/wp-content/uploads/2018/08/BB-SBL-Prozessf%C3%A4higkeit-bewerten-V13-2015-01-15.pdf"">, 85 pages (with Machine translation).
International Preliminary Report on Patentability in International Application No. PCT/EP2020/064409, dated Nov. 16, 2021, 11 pages.
International Search Report and Written Opinion in International Application No. PCT/EP2020/064409, dated Jul. 9, 2020, 14 pages.
iso.org [online], "Uncertainty of measurement—Part 4: Role of measurement uncertainty in conformity assessment," ISO/TMGB Technical Management Board, Dec. 2012, 62 pages.
Young, "tolerance: An R Package for Estimating Tolerance Intervals," Journal of Statistical Software, Aug. 2010, 36(5): 1-39.
Communication Pursuant To Article 94(3) EPC, EP Patent Application No. 20728027.2, dated Dec. 6, 2024, pp. 1-4.
Communication Pursuant To Article 71(3) EPC, EP Patent Application No. 20728027.2, dated Apr. 7, 2025, 1 pp. 1-50.

* cited by examiner

METHODS FOR DETERMINING A LIMIT OF A TOLERANCE INTERVAL, METHOD FOR EVALUATING A PRODUCTION PROCESS AND CORRESPONDING CALCULATION DEVICE

CROSS REFERENCE TO RELATED APPLICATIONS

The present application is the national stage entry of International Patent Application No. PCT/EP2020/064409, filed on May 25, 2020, and claims priority to Application No. EP 19305653.8, filed on May 24, 2019, the disclosures of which are incorporated herein by reference.

TECHNICAL FIELD

The disclosure relates to methods for determining a limit of a tolerance interval, to methods for evaluating a production process, and to corresponding calculation devices.

BACKGROUND

ISO (International Organization for Standardization) 16269-6 Statistical interpretation of data—Part 6: Determination of statistical tolerance intervals, 2014 (E), or higher or lower version, i.e., older or newer, relates to methods for estimating at least one limit of a tolerance interval that is valid for the production process of devices.

There are tolerance intervals that are limited on both sides, i.e., two sided tolerance intervals. However, it is also possible to use tolerance intervals that are limited only on one side and that are open on the other side, i.e., one sided tolerance intervals. "Open" may mean here that no tolerance is specified for a technical measure into one direction, i.e., with regard to an upper limit or with regard to a lower limit.

The calculation of tolerance intervals according to ISO 16269-6 is for tolerance intervals of technical parameters having a distribution function in which all values may be present in principle. However, there are also technical parameters that may have a technical limit, either an upper limit that may not be exceeded or a lower limit under which the parameter may take no values. For instance, a force may always be greater than zero.

SUMMARY

It is an aspect of the disclosure to provide improved methods for determining a limit of a tolerance interval. The methods can consider the influence of a technical limit to the calculation of limits of tolerance intervals. Furthermore, an improved method for the evaluation of a production process is disclosed. A corresponding computer program product and a calculation device for performing the methods should also be provided.

In one aspect, a method for determining a limit of a tolerance interval comprises:
- a) providing a plurality of sample values, wherein the sample values fluctuate and define a sample value distribution, the sample values being values of a technical parameter related to sample items of a sample, wherein the sample items are parts of drug delivery devices, assemblies for drug delivery devices, or drug delivery devices, wherein the sample items are of the same construction and have been manufactured according to the same specification and wherein the technical parameter is limited by at least one technical limit value,
- b) depending on the technical parameter and/or the sample values, choosing a probability distribution function,
- c) using the technical limit value to determine a cutoff value for the probability distribution function,
- d) specifying a probability content for the tolerance interval, and
- e) providing, e.g., by calculating, the limit of the tolerance interval or at least two limits of tolerance intervals for the technical parameter based on a transformed probability content, wherein the transformed probability content is based on the cutoff value and based on the specified probability content.

The sequence of steps a) to e) may be varied. However, steps a) to d) may be performed before step e) which is based on results of steps c) and d). Step c) is based on the result of step b). Thus, step b) may be performed before step c). The sequence of steps c) and d) may be interchanged for instance.

The method may be a method for determining a limit of a tolerance interval wherein the at least one limit of the tolerance interval may be used for a technical purpose, especially for manufacturing of drug delivery devices or of related parts or assemblies and/or wherein statistical tolerances are used for manufacturing quality control and/or monitoring of drug delivery devices or of related parts or assemblies, especially by the following:
- f) the at least one limit of the tolerance interval may be compared with a limit of a specification interval for production items that have the same construction or the same construction design as the sample items and that preferably have been manufactured according to the same specification, e.g., product specification or manufacturing specification.
- g1) dependent from the result of the comparison, a production process of the production items may be started, continued or started again if the at least one limit of the tolerance interval lies or is within a specification interval for the production, or
- g2) dependent from the result of the comparison, alternatively, the production process of the production items may not be started or stopped if the at least one limit is outside of the specification interval.

Steps a) to e) may be performed before step f). Step f) may be performed before step g1) or g2).

The method may be a method for determining a limit of a tolerance interval, wherein the at least one limit of the tolerance interval may be used to adjust a production process, especially a production process for manufacturing of drug delivery devices or of related parts or assemblies.

The probability content may be defined, for instance, as in ISO 16269-6:2014(E) as is described below in more detail. The usage of a transformed probability content is a simple way to take consideration of technical limits that influence the valid area of a supposed probability distribution function. Other methods that try to consider technical limits, in which no transformation of the probability function is necessary, may lead to questionable results. Furthermore, no complicated algorithm, especially no iterative algorithm, has to be used and even no exact integration, both of which may consume much calculation power and calculation time of a digital processor. Furthermore, the results of the proposed method are comprehensible and adequate for practical applications, especially within the medical device field.

The same method may also be applied to other devices than drug delivery devices, e.g., to other medical devices or to other industrial devices.

The term "same construction" may refer to the same construction design, e.g., having same shapes, same mechanical properties, based on same CAD (Computer Aided Manufacturing) data, produced within the same mold (injection mold) and/or produced in the same cavity of an injection mold. Items of the same construction may differ from one another only on account of manufacturing tolerances.

A part may be a single or separate element. At least two parts that are functionally connected to one another may form an assembly. A drug delivery device may be a device that carries out movements required for a dispensing operation in order to dispense a drug from a reservoir containing the drug. The drug delivery device may be an injection device and/or may comprise a reservoir filled with the drug.

The specification may be a product specification or a manufacturing specification. The specification may specify upper values and/or lower values that have to be observed.

A probability distribution function may be chosen that is or should be indicative for the sample value distribution, e.g., for the underlying sample values distribution.

Only one limit may be provided or calculated for a univariate (one-dimensional) probability distribution function. For multivariate (multi-dimensional) probability distribution functions it is possible to calculate more than one limit according to the proposed method if there is more than one technical limit involved. An example of a multivariate distribution function is a bivariate distribution function.

Providing the tolerance limit may comprise that calculations may be performed. Alternatively or additionally look-up tables may be used. Providing may also comprise that calculations take place anywhere, e.g., on a different place and/or on a different computing device than that which is used to provide the probability content and/or the transformed probability content and/or the technical limit value.

There may be, in principle, the following phases if the industrial production process of a device is realized: design, fabrication of one or several prototypes, small series production process, medium series production process, and large series production process. It may be advisable to start the next phase only when and if it is clear or likely that the tolerances and other specification will also be reached within the next phase. The proposed method allows the calculation of limits of tolerance intervals and may be the basis for further decisions whether to start a further phase or whether to take other actions, e.g., redesigning or choosing different or modified production methods.

However, even when the production process of a device already takes place, it may be the case that device parameters are modified that may influence device parameters that have already been evaluated. A further evaluation may be necessary therefore, and the proposed method may be applied or applied again.

The proposed procedure may be especially advantageous for admission procedures because technical limits are taken into consideration for the calculation of a limit or of the two limits of a tolerance interval. These admission procedures may be performed before governmental agencies, for instance before the FDA (Food and Drug Administration) in the US (United States of America).

The sample values may also be named as observations. The sample may be a random sample from a larger amount of devices or from device parts. Alternatively, the sample may include all drug delivery devices, drug delivery device parts, or assemblies of drug delivery devices that are available at the moment, for instance if only a small series is produced in order to prepare industrial production process.

The limit of the tolerance band or tolerance interval may be calculated or estimated based on statistical parameters of the sample values. The sample values may be determined or measured, where measurement includes the consideration of international units of the SI (System International) system.

The number of samples may be smaller than the number of devices that are available or that will be produced in the future, for instance smaller than 10 percent or smaller than 1 percent but greater than, for instance, 0.001 percent. The envisaged production process may be, for instance, the production process during a determined time period, for instance one day, one week, one month, etc. The number of devices that is produced within the production period may be larger than 100, larger than 1000, or larger than 10000 devices. However, the number of produced devices may be smaller than 100 million devices.

A normal distribution may be supposed for the probability distribution function. This may be tested using, for instance, the Anderson-Darling test or another appropriate test. Then an estimated mean value and an estimated standard deviation may be calculated and used for the proposed method. However, other probability distribution functions may also be used, for instance a log-normal, Weibull, Gumbel, or Fréchet distribution function. It is also possible to use other statistical descriptors, for instance the estimated median.

The specified probability content may refer to a proportion or percentage of an overall amount of production items wherein the production items are parts of drug delivery devices or other devices, assemblies for drug delivery devices (other devices) or drug delivery devices (other devices) of the same construction as the sample items. This amount of production items may have been already produced or may be produced in the future. The amount may be greater than the size of the sample from which the sample values have been taken by at least a factor of 10, of 100, or of 1000.

The specified probability content is named as a proportion according to ISO 16269-6:2014(E) and its meaning is better understandable if the confidence value is considered too. A confidence level value 1−α may be used that specifies the probability that the tolerance interval that has to be estimated for the technical parameter will contain values of the technical parameters of at least the proportion of the production items that is specified by the probability content. The at least one limit of the tolerance interval may be calculated using also the determined confidence level value. Conversely, the probability that the estimated tolerance interval will contain less than the proportion of the production items is α.

Thus, the sample values may be distributed having a technical limit. A mathematical probability distribution function may model the distribution of the sample values. In order to reflect the technical limit of the sample values, the probability distribution function may need to be truncated at a cutoff value representing the technical limit.

At least one descriptive parameter or at least two descriptive parameters of the sample values may be calculated and used to calculate the cutoff value of the probability distribution function. The cutoff value may be determined by a mapping or an overlying of the supposed probability distribution function over a histogram of the sample values. This is explained below with regard to FIG. 3 in more detail. The statistical descriptive parameters may be the mean value and the standard deviation, especially if a normal distribution function is used for the calculations.

The physical parameter may be one of the following parameters of a drug delivery device: a) dose accuracy, b) dial torque, c) dispense force, d) cap attachment force, e) cap removal force, f) needle shield removal force, g) injection time, h) activation force, i) blocking distance of a needle cover, j) needle extension, k) expelled volume or l) assembly force. All of these parameters may be restricted by a technical limit. The proposed method allows the calculation of reliable data for the limit of the tolerance interval under consideration of the technical limit that these parameters have. However, alternatively, tolerance intervals for other physical parameters may be calculated according to the proposed method, especially tolerance intervals or at least one tolerance limit for a thickness parameter or for a length parameter.

a) Dose accuracy: The dose accuracy may be relevant for devices having only a predetermined dose or for devices that allow dialing of different doses. The injection device may be an autoinjector that injects a constant amount of a fluid. Alternatively or additionally, it may be possible to dial or select a dose within a specific range. In the latter case, the dose accuracy is an indicator for the precision with which the dialed dose corresponds to the expelled dose.

No dose below 0 ml (milliliter) may be possible, i.e., there is a technical limit. This may be especially relevant for 1 IU testing. The international unit IU is related to the physiological effect of a medicament/drug to the human body. The dose accuracy may measure a quantity of a fluid that is expelled from a device, especially from a drug delivery device/injection device. The drug may be insulin or another medicament for the treatment of diabetes. Alternatively, the drug may be used for a hormone treatment (thyroid gland) or for other treatments. The drug may be a drug from the list that is mentioned below.

The dose may relate to the amount of a drug that is in a container, for instance in a cartridge, in an ampulla, or in a pre-filled syringe. The dose within the container may be different from the dose that is expelled, see k) below.

b) Dial torque for dialing a dose: insulin pens or other drug delivery devices may contain a dose/dial button (operating member) that is used to choose a dose. By rotating the button, the pen mechanism is prepared to expel the dose which is chosen. In order to rotate the button, a torque is applied and a corresponding torque can be measured or be determined in a test. That torque is always above zero as there is no mechanism that reverses the dialed dose. Optionally the dose/dial button may be connected to a spring in the pen or device mechanism. In that case the spring is loaded by rotating the button (operating member). In order to load the spring a torque is applied and a corresponding torque can be measured or be determined in a test. That torque is always above zero as potential energy is generated by loading the spring. The dial torque is not necessarily the same, if the same dose is dialed. But it shall be within a range that is defined according to specification limits.

c) Dispense force: The dispense force may be necessary for dispensing a dose of the drug manually or by an energy storing element, for instance using a spring. Measurements may be done with a 10 N (Newton) counterweight. The dispense force may have to be generated by a user of the drug delivery device or by a spring, for example. The user may be a child, an elderly person or a person that has restricted motoric capabilities or reduced dexterity.

d) Cap attachment force: The cap of a drug delivery device may be secured to the drug delivery device for instance by using a snap feature. The cap may cover a needle of the drug delivery device. The cap may have to be replaced after use to prevent injuries or the transfer of disease if unintentional contact is made with the needle of the drug delivery device. The force for cap attachment should not be too strong to enable also weak users to attach the cap, for instance users with restricted motoric capabilities or reduced dexterity. On the other side a good fit of the cap is necessary to prevent unintentional removal of the cap. The proposed method enables reliable numbers for the cap attachment force that may be used to estimate if the devices are within a specification limit.

e) Cap removal force: The cap must not be fastened too loosely to prevent unintentionally removing of the cap and injuries of a person by unintentional contact with the needle. On the other side the cap must not be fastened too tightly to allow removal of the cap by weak users, e.g., users with restricted motoric capabilities or reduced dexterity. The proposed method enables reliable numbers for the cap removal force that may be used to estimate if the devices are within a specification limit.

f) Needle shield removal force: A cap may be removed from an autoinjector or another drug delivery device wherein the cap contains a needle shield. When the cap is removed together with the needle shield, the autoinjector may be ready for activation. Depending on the design of the device the needle shield removable force may be the same as the cap removal force or may be different therefrom.

g) Injection time: Again this feature may be especially relevant for an autoinjector device. The user should be able to rely on a constant injection time.

h) Activation force: This may be the force that a user has to raise in order to activate delivery of the drug, for instance by pressing a button at the proximal end of a drug delivery device or moving another trigger member. This is an important parameter for drug delivery devices. The proposed method allows a reliable estimation of the value for this parameter.

One type of an activation force is a needle cover activation force that may be relevant for autoinjector devices. After the cap/needle shield is removed, the needle is still protected by a needle cover. This may be a plastic part, which can be pushed back. This is done by pressing the autoinjector against the body. The force needed to push back the needle cover is called the needle cover activation force. For some autoinjectors an activation button may need to be pressed in addition. Thus, it may be useful to determine or measure two different kinds of activation force.

i) Blocking distance of needle cover: This may be especially relevant for an autoinjector device. The needle of an autoinjector may be protected by a movable needle cover before and after injection. A blocking force may relate to a blocking of the movable needle cover against proximal axial movement after injection. A certain force may be applied for testing that protection, e.g., 50 N (Newton). Then, the distance may be measured how much the needle cover moves. The blocking may prevent injuries after use of the drug delivery device. Reliable data for the limit of the tolerance interval for this parameter are especially important.

The lower technical limit may be 0 mm. More specifically 0 mm may be the distance, when the first contact with the needle cover is detected by the force sensor. An upper technical limit may be defined by the total length of the needle cover extension. But this may be usually less relevant as the specification limit is much smaller.

Measuring the blocking distance may be one way to implement the test. Measuring the blocking force may be an alternative way for testing the blocking of the needle cover after an injection.

j) Needle extension: The needle extension may be the distance the needle extends or is extended from the autoinjector during injection. This extension may be characteristic for the injection depth. The injection depth may depend on the length of the needle and/or on its mounting position.

k) Expelled volume: More volume cannot be expelled than volume filled into the container, e.g., cartridge/syringe. The expelled volume may be relevant for the success of a medical treatment using the device.

l) Assembly force: for instance for assembling different parts of the housing or for assembling parts into the housing, e.g., for connecting two parts to one another. The assembly force may be in the range of 10 N (Newton) to 50 N. The assembly of components is typically force controlled. Samples where the limit is exceeded may be rejected. Thus, when statistical analysis of these in-process control and/or monitoring parameters is performed a truncated distribution occurs. 30 N may be an example. It can vary depending on the device/process step. The assembly force may be an indirect indicator to the overall device functionality. If the assembly force is too high or too low this may indicate that something is wrong and that the functionality of the device may be impaired.

The parameters listed above may be determined and compared with nominal values that have SI (System International) units or that do not have SI units. Especially, measuring of these parameters is possible, i.e., a comparison with SI units. Thus, it is possible to fulfill requirements given in standards with relation to the SI system.

Some of the force parameters may be related to a mechanical energy storage device within the medical device, for instance to a mechanical spring. Examples for mechanical springs that may be used are helical springs, spiral springs, and/or leaf springs. The springs may be tension or compression springs.

The at least one limit of the tolerance interval may be an upper limit that is compared with an upper specification limit of a specification for a production process of devices that may also be valid for the sample items. Comparison may be made in order to evaluate a production process. If the at least one tolerance limit is within the specification limit a production process may be scaled for instance. If the at least one tolerance limit is outside the specification limit additional action are necessary, for instance a redesign of the device or the usage of other production methods. The parameter may be a force parameter or another parameter. The technical limit may be a lower limit that truncates the probability distribution function at the left side.

Alternatively, the at least one limit may be a lower limit that is compared with a lower specification limit of a specification for a production process of devices. The specification may also be valid for the sample items. Comparison may be made in order to evaluate a production process. Depending on the result of the evaluation the actions mentioned above may be performed. The parameter may be an expelled volume of a drug or dose accuracy. The technical limit may be an upper limit that truncates the probability distribution function on the right side, for instance the maximum volume of a container that contains the drug that is expelled or that is retained within the container.

The transformed probability content may be calculated using the specified probability content and a value that is determined by or equal to the area of a truncated part of the probability distribution function, i.e., the value of a cumulative distribution function of the probability distribution function considering the cutoff value. The truncated part may be within a range that begins at minus infinity or at a corresponding value and that ends at the cutoff value, i.e., there will be a left side truncation. Alternatively, e.g., for a right side truncation, the truncated part may be within a range that begins at the cutoff value and that ends at plus infinity or at a corresponding value. Instead of minus infinity and plus infinity appropriate large numerical values may be used, for instance a number in the range of 100 to 100 million. The area of the truncated part is a simple and descriptive feature that is easy to calculate. The actual probability content may be a linear transformation of the desired or specific probability content. The area of the truncated part may be subtracted from the specific probability content and a normalization may be made by dividing the difference through the area of the remaining portion of the distribution.

An actual probability content may be calculated using the specified probability content, the cumulative distribution function of the probability distribution function, and the cutoff value. For a lower or left side truncation the actual probability content may be calculated according to:

$$pc_{act}=(pc-F(\xi_L, p))/(1-F(\xi_L, p)),$$

wherein pc is the specified probability content, $F(\xi_L, p)$ is the cumulative distribution function of the probability distribution function starting at plus infinity or a corresponding value and ending at a lower truncation value $\xi_L$, and p is a vector of the characteristic or descriptive parameters of the probability distribution function or of an approximation of the characteristic parameters. This is a comparatively simple equation that is easy to calculate, for instance using low processing power and time of a digital electronic processor. This may be a first step e1) for providing the limit of the tolerance interval in step e).

Alternatively, the actual probability content for an upper or right side truncation may be calculated according to:

$$pc_{act}=(pc-(1-F(\xi_R, p)))/(F(\xi_R, p)),$$

wherein pc is the specified probability content, $F(\xi_R, p)$ is the cumulative distribution function of the probability distribution function starting at an upper truncation value $\xi_R$ and ending at plus infinity or at a corresponding value, and p is a vector of the characteristic or descriptive parameters of the probability distribution function or of an approximation of the characteristic parameters. This equation is similar to the equation for the left side truncation, e.g., easy to calculate. This may be a first step e1) for providing the limit of the tolerance interval in step e).

In both cases the characteristic or descriptive parameters may be the mean value and/or the standard deviation, especially if a normal distribution function is assumed and used for calculation. Alternatively other kinds of distribution functions may be assumed and used.

The transformed probability content may be calculated using the specified probability content and the actual probability content. The transformed probability content may be calculated by calculating the sum of the specified probability content and of the difference between the specified probability content and the actual probability content for instance according to:

$$\widehat{pc} = pc + (pc - pc_{act}) = 2 \cdot pc - pc_{act},$$

wherein $\widehat{pc}$ is the transformed probability content,
pc is the specified probability content, and
$pc_{act}$ is the actual probability content. This may be a second step e2) for providing the limit of the tolerance interval in step e).

Thus, the transformation of the specific probability content may be a linear function of the specified or desired probability content and of the area of the truncated part or portion. The area of the truncated part depends on the truncation threshold, i.e., the cutoff value, in a non-linear way. The calculations of the transformed probability content may result in formulas (2) and (3) as indicated below.

The transformed probability content may be used to calculate a tolerance limit factor that is used to calculate the at least one limit of the tolerance interval. At least one of the descriptive parameters of the probability distribution function may also be used to calculate the at least one limit of the tolerance interval. In the case in which the probability distribution function is a normal distribution, the calculation of the at least one limit of the tolerance interval may be done according to the equation:

$$UTBL = \bar{x} + \hat{k} \cdot s, \text{ or}$$

$$LTBL = \bar{x} - \hat{k} \cdot s,$$

wherein UTBL is an upper limit of the tolerance interval,
LTBL is a lower limit of the tolerance interval,
$\bar{x}$ is the mean value of the sample values,
$\hat{k}$ is the transformed probability content, and
s is the standard deviation of the sample values.

The descriptive parameters of the probability distribution function may be the same as the descriptive parameters of the cumulative probability distribution of the distribution function. This may be a third step e3) for providing the limit of the tolerance interval in step e).

The article "An R package for Estimating Tolerance Intervals", Derek S. Young, Journal of Statistical Software, August 2010, Volume 36, Issue 5, page 1 to 39, especially section 4.8. (Univariate) normal tolerance intervals, mentions that there is an exact solution for k in the case of a one sided setting, i.e., a one sided tolerance interval. If the transformed probability content is used the transformed tolerance limit factor $\hat{k}$ may be calculated in the same way:

$$\hat{k} = 1/\text{sqrt}(n) t^*_{n-1; 1-alpha}(\text{sqrt}(n) z_P)$$

such that n is a natural number indicating the sample size, $t^*_{n-1; 1-alpha}$ (delta) is the $(1-\alpha)$-th quantile of a non-central t distribution with d degrees of freedom, e.g., n−1, and non-centrality parameter delta, and $z_P$ is the P-th percentile of the standard normal distribution. P is the proportion and the transformed probability content $\widehat{pc}$ should be used for P. Sqrt( ) is the square root function. Alternatively, the exact solution may also be calculated by numerical integration. However, the numerical effort, i.e., processor power, may be much larger compared to the usage of the analytical exact solution. This may be a first part of the third step e3). The calculation of UTBL or LTBL may be the second part of the third step e3).

The device may be a medical device and ISO 11608-1 "Needle based injection systems for medical use—Requirements and test methods—Part 1 Needle based injection systems, 2014 or an earlier or later version thereof is met with regard to the calculation of the at least one limit of the tolerance interval. Thus, the current standard may be modified to also include the proposed method in the future. This may allow a production of devices with high quality standard.

A test may be performed whether it is necessary to calculate a transformed probability content. The following test equation may be used:

$$|\bar{x} - \xi| \text{ smaller or equal to } 3 \cdot s,$$

wherein $\bar{x}$ is the mean value of the sample values,
s is the standard deviation of the sample values, and
|| is the absolute value operation.

A transformed probability content may be calculated and used for the calculation of the at least one limit of the tolerance interval if the test equation is fulfilled. Alternatively, only the specified probability content may be used for the calculation of the at least one limit of the tolerance interval but not the transformed probability content if the test equation is not fulfilled.

A further aspect relates to a method for the evaluation of a production process, comprising the same steps as the method for determining a limit of a tolerance interval. Furthermore, the at least one limit of the tolerance interval is compared with a limit of a specification interval for production items that have the same construction or the same construction design as the sample items and that preferably have been manufactured according to the same specification, e.g., product specification or manufacturing specification. A production process of the production items may be started, continued, or started again if the at least one limit of the tolerance interval lies or is within a specification interval for the production. Alternatively, the production process of the production items may not be started or stopped if the at least one limit is outside of the specification interval.

The method for the evaluation of a production process may use the method for determining a limit of a tolerance interval or the embodiments thereof that are stated above. Therefore, the same technical effects as stated above also apply to the method for evaluation of a production process.

The proposed methods may be used for preparing the industrial production process of devices, e.g., of medical devices. The medical devices may be drug delivery devices and injection devices, e.g., autoinjector devices or manually operated injector devices. Prototypes or a small series may be manufactured, for instance less than 100 pieces, less than 500 pieces, or less than 1000 pieces. If the at least one limit of the tolerance interval is within a specification interval an industrial production process may be started, i.e., a production of for instance more than 1000 pieces or of more than 10000 items per year or even more.

Another aspect relates to a computer program product having computer readable program code portions (instructions) which when executed on a controller or on a processor carry out at least one, an arbitrarily selected plurality of, or all of the method steps according to the methods mentioned above. Thus, the features, advantages and technical effects that are valid for the proposed methods and its embodiments may also be valid for the computer program product. The computer program product may be used in many industries, for instance medical device production, automotive industry, semiconductor industry, solar industry, chemical industry, etc. The computer program product may be a CD (Compact Disc), a data stream on the internet, data stored in a RAM (Random Access Memory), ROM (Read Only Memory, for instance PROM (Programmable ROM), EPROM (Erasable PROM) or EEPROM (Electrical EPROM)), in a magnetic hard disc, in an optical disc, in solid state device memory, or in other digital memory devices.

Standard statistical software packages may be modified to calculate also the transformed probability content and to calculate the at least one limit of the tolerance interval according to the proposed method or methods, A last aspect relates to a calculation device, for instance to a computer, laptop, smartphone, tablet etc., comprising:
- a processor that is configured to execute instructions, for instance of a program,
- a memory that is configured to store the instructions and to store data that is used or generated during the execution of the instructions,
- a first data providing unit, e.g., an input device, that is configured to input data that will be stored in the memory and that may be used during the execution of the instructions, and
- a second data providing unit, e.g., an output device that is configured to output data that is generated during the execution of the instructions, and
- a computer program product of the third aspect or a computer program product that calculates a transformed probability content based on a truncation of a probability distribution function that is used to calculate at least one limit of a tolerance interval.

Thus, the features, advantages, and technical effects that are valid for the proposed methods and its embodiments may also be valid for the calculation device.

The first data providing unit may be an input file or a keyboard, touchscreen, etc. The second data providing unit may be an output file or a monitor, a screen, e.g., a touch screen, or another display device.

The making and using of the presently preferred embodiments are discussed in detail below. It should be appreciated, however, that the present disclosure provides many applicable concepts that can be embodied in a wide variety of specific contexts. The specific embodiments discussed are merely illustrative of specific ways to make and use the disclosed concepts, and do not limit the scope of the claims.

Moreover, same reference numerals refer to same technical features if not stated otherwise. As far as "may" is used in this application it means the possibility of doing so as well as the actual technical implementation. The present concepts of the present disclosure will be described with respect to preferred embodiments below in a more specific context namely the production process of drug delivery devices. The disclosed concepts may also be applied, however, to other situations and/or arrangements as well, for instance to the production process of cars, of semiconductor products or of chemical products.

The foregoing has outlined rather broadly the features and technical advantages of embodiments of the present disclosure. Additional features and advantages of embodiments of the present disclosure will be described hereinafter, e.g., of the subject-matter of dependent claims. It should be appreciated by those skilled in the art that the conception and specific embodiments disclosed may be readily utilized as a basis for modifying or designing other structures or processes for realizing concepts which have the same or similar purposes as the concepts specifically discussed herein. It should also be recognized by those skilled in the art that equivalent constructions do not depart from the spirit and scope of the disclosure, such as defined in the appended claims.

BRIEF DESCRIPTION OF FIGURES

For a more complete understanding of the presently disclosed concepts and the advantages thereof, reference is now made to the following description in conjunction with the accompanying drawings. The drawings are not drawn to scale. In the following drawings.

DETAILED DESCRIPTION

Figure 1:
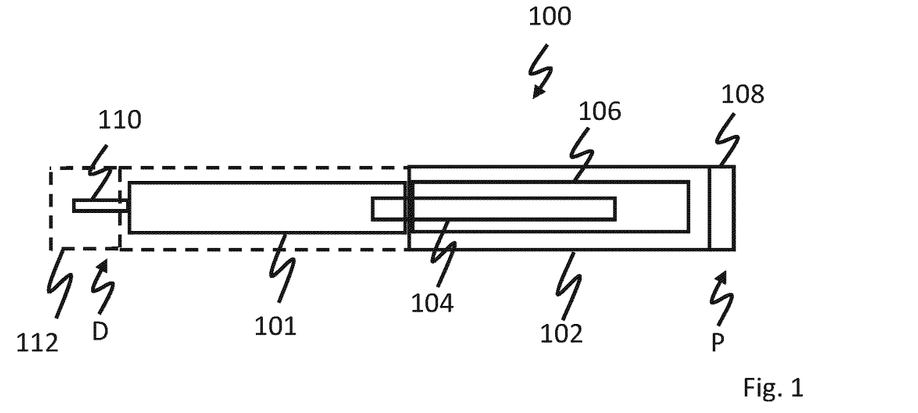
FIG. 1 illustrates a drug delivery device.

FIG. 1 illustrates a drug delivery device 100 that may comprise a container retaining member 101. The drug delivery device 100 may comprise a main housing part 102 that houses the container retaining member 101 completely or partially and that comprises further parts of the drug delivery device 100. Alternatively the main housing part 102 may be connected to the container retaining member 101 but may not surround it and even may not surround a part of the container retaining member 101, see dashed line in FIG. 1.

Within the main housing part 102 the following may be arranged:
- a piston rod 104 that is adapted to move the piston of the container that is within container retaining member 101,
- a driving mechanism 106 for the piston rod 104. The driving mechanism 106 may comprise an energy storing element, for instance a spring, that is loaded manually or automatically, for instance during assembling of drug delivery device 100 or before each use,
- for instance at an proximal end P, an actuating element 108 that is used for the initiation of a movement of the piston rod 104 into the container retaining member 101, whereby the driving mechanism 106 is used. Alternatively, an autoinjector device may be used that is actuated by an axial movement of a movable needle shield.
- a cap 112 that may be attached to main housing part 102 or to another part of drug delivery device 100. Cap 112 may be an outer cap that may include a smaller inner cap that protects needle 110 directly.

Drug delivery device 100 may be a single use or a multiple use device. Actuating element 108 may be part of a trigger mechanism that is triggered from the distal end, for instance if drug delivery device 100 is an auto injecting device.

The drug may be dispensed from the container through a needle 110 or through a nozzle that is connectable and/or connected to the distal end D of drug delivery device 100. Needle 110 may be changed before each use or may be used several times.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N-(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N-(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C, CM-3, GLP-1 Eligen, ORMD-0901, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, TT-401, BHM-034. MOD-6030, CAM-2036, DA-15864, ARI-2651, ARI-2255, Exenatide-XTEN and Glucagon-Xten.

An examples of an oligonucleotide is, for example: mipomersen sodium (Kynamro®), a cholesterol-reducing antisense therapeutic for the treatment of familial hypercholesterolemia.

Examples of DPP4 inhibitors are Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

Figure 2:
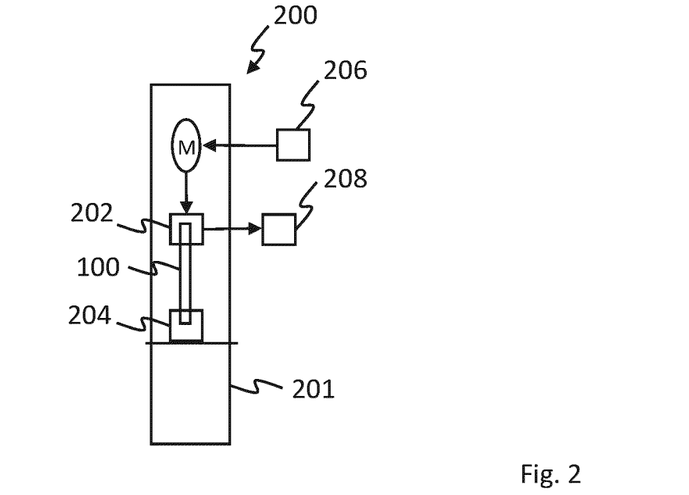
FIG. 2 illustrates a test setup device for drug delivery devices.

FIG. 2 illustrates a test setup device 200 for testing at least one parameter of drug delivery devices, especially of drug delivery devices 100. Test setup device 200 may comprise:
  a mounting arrangement 201 that allows vertical movement of some parts of test setup device 200,
  a motor M that generates a torque for the movement of the movable parts,
  an upper clamp device 202 that may clamp the distal end or the proximal end of a device under test,
  a lower clamp device 204 that may clamp the other end of the device under test,
  a control device 206 that may control the movement that is generated by motor M, and
  a measurement reporting device 208 that is connected for instance to a force sensor.

Other parts of test setup device 200 are not shown, for instance an optional scale, an electrical power supply unit, etc.

Upper clamp device 202 and/or lower clamping device 204 may be movable relative to each other in order to generate or exert a force that is applied onto the device under test (DUT).

Test setup device 200 may be used to measure forces that are relevant for drug delivery devices 100 or for other devices. In the following, it is assumed that test setup device 200 is used to measure the force of cap attachment of cap 112, see item d) that is mentioned within the introduction part of the description. The drug delivery devices 100 under test may be devices of device type U300max that is produced by the applicant of this application. However, other device types may also be tested.

A completely assembled drug delivery device 100 may be clamped into test setup device 200. Cap 112 may be held by lower clamp device 204. The proximal end P of drug delivery device 100 may be held by upper clamp device 202. However, it is also possible that cap 112 is hold in upper clamp device 204 and that the proximal end of drug delivery device 100 is held in lower clamp device 204.

It is assumed that the cap attachment force of 19 drug delivery devices 100 is measured. These drug delivery devices 100 may be prototypes or part of a small series production process. Alternatively the devices may be taken out of a large series production process. One example of test measurements is shown in FIG. 3.

Figure 3:
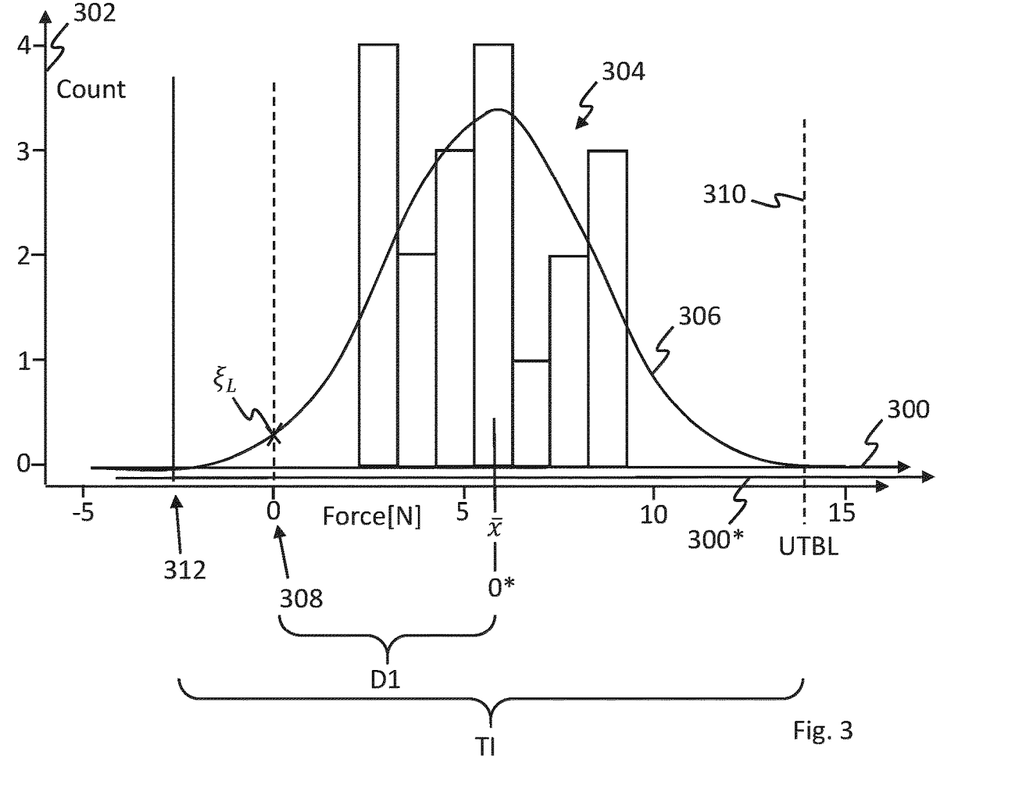
FIG. 3 illustrates empirical values measured with the test setup device.

FIG. 3 illustrates empirical values measured with test setup device 200 for the cap attachment force of 19 drug delivery devices 100. A horizontal x-axis 300 is used to classify the sampled values x of the cap attachment force of cap 112 into classes that have a width of for instance 1 N (Newton). There may be classes with class ranges of 0.5 N to 1.5 N (class 1), 1.5 N to 2.5 N, of 2.5 N to 3.5 N, of 3.5 to 4.5 N etc. The sample values are located within 7 classes:

class 2 from 1.5 N to 2.5 N: 4 sample values,
class 3 from 2.5 N to 3.5 N: 2 sample values,
class 4 from 3.5 N to 4.5 N: 3 sample values,
class 5 from 4.5 N to 5.5 N: 5 sample values,
class 6 from 5.5 N to 6.5 N: 1 sample value,
class 7 from 6.5 N to 7.5 N: 2 sample values,
class 8 from 7.5 N to 8.5 N: 3 sample values.

A vertical y-axis 302 shows the number of samples within a respective class. Columns 304 represent the frequency of force values of cap attachment force. The mean value $\bar{x}$ is determined and in the example the mean value $\bar{x}$ may have a value of about 6 N. Furthermore, the standard deviation s is calculated for all of the 19 sample values x.

Based on the mean value $\bar{x}$ and on the standard deviation s a normal probability distribution function 306 (density function, PDF) may be calculated and mapped over the histogram that shows the classes 2 to 8.

There is a truncation threshold 308, i.e., a technical limit TL, under which the cap attachment force may not occur. The value of the threshold 308 is 0 N.

FIG. 3 shows an upper tolerance band limit 310, UTBL for the case in which a truncation due to the technical limit TL is not considered. Furthermore, a calculated lower tolerance band limit 312, LTBL is shown for the case in which a truncation due to the technical limit TL is not considered. Upper tolerance band limit 310, UTBL and lower tolerance band limit 312, LTBL define a tolerance interval TI. Lower tolerance band limit LTBL is located left from technical limit 308, i.e., it has a value that is smaller than the technical limit 308.

The histogram that is shown in FIG. 3 may be an accurate representation of the distribution of numerical data. It may be an estimate of the probability distribution of a continuous variable. The probability distribution function 306 may be truncated in order to consider the technical limit 308 for the calculation of the upper tolerance band limit 310. It is supposed that even if the truncation is considered the lower tolerance band limit LTBL will not move over the technical limit 308. Therefore, the tolerance interval TI is a one sided tolerance band or tolerance interval TI that has only an upper tolerance band limit UTBL. For example, the tolerance interval TI is calculated as one-sided. However, when the distribution is truncated at $\xi_L$ the value of $\xi_L$ can be interpreted as a lower tolerance band limit.

In order to consider the technical limit 308 for the calculation of upper tolerance band limit UTBL a cutoff value $\xi_L$ has to be determined. This can be done graphically or by simple arithmetic calculations. In the example, a further coordinate system may be used that has an x-axis 300*. The x-value zero is where the maximum of the probability distribution function 306 is located, i.e., this corresponds to the location of mean value $\bar{x}$ on x-axis 300. The value of $\xi_L$ corresponds to the negative of the mean value $\bar{x}$.

Figure 6:
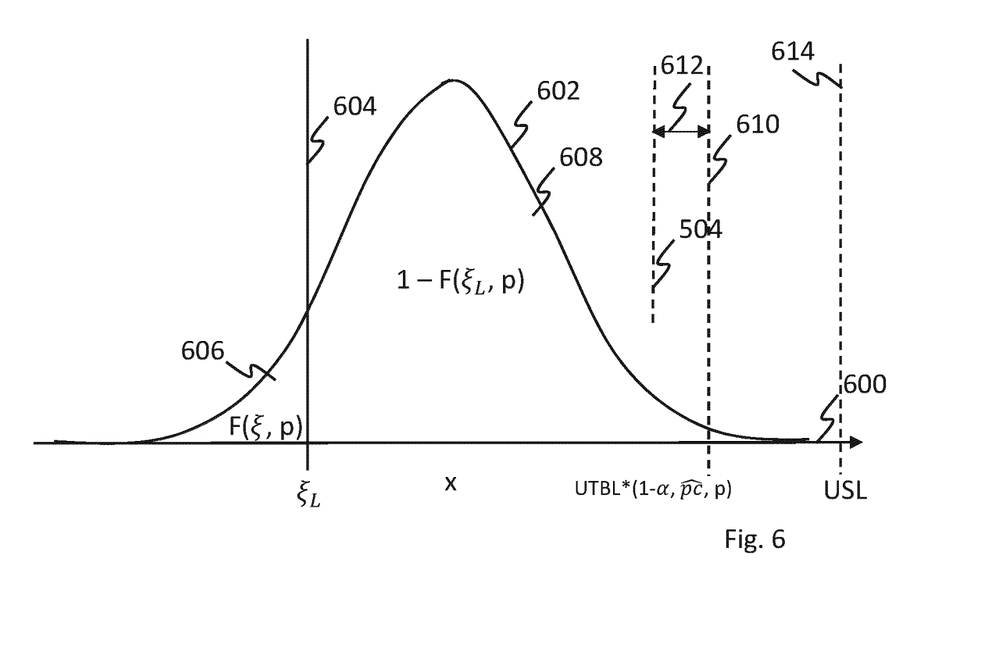
FIG. 6 illustrates the plot of the density function of a given distribution with left truncation.

Further optional steps may be necessary, for instance normalization of probability distribution function 306 and/or of value before further calculations are made or standard statistical software packages or modified standard statistical software packages may be used. The purpose of the normalization is to make the area that is contained below probability distribution function 306 to have the value 1. This may require a compression or an expansion in x-direction and/or a scaling in y-direction. These steps may be done automatically by performing a corresponding script for a statistical software package. FIG. 6 shows a probability distribution function 602 that is truncated. The steps that are performed to calculate a transformed upper tolerance band limit UTBL* considering the technical limit 308 are described with regard to FIG. 6 below.

Figure 4:
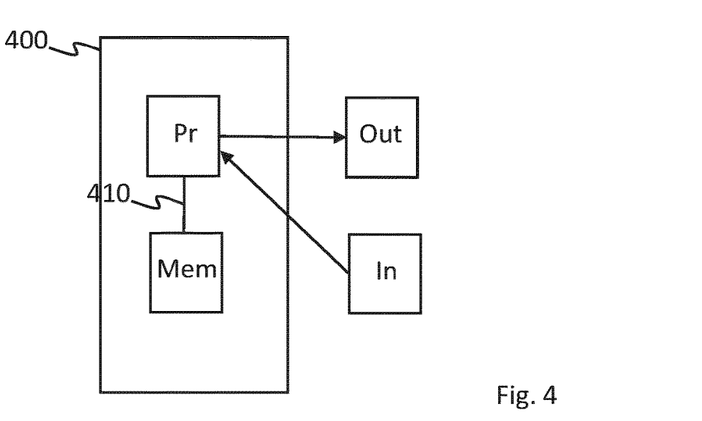
FIG. 4 illustrates a calculation device (computer) for calculating transformed tolerance band limits.

FIG. 4 illustrates a calculation device 400 (computer) for calculating transformed tolerance band limits. Calculating device 400 may comprise:
  a processor (Pr) configured to execute instructions, especially for performing the disclosed calculations,
  a memory (Mem) that is configured to store the instructions and to store data that is used or generated during the execution of the instructions,
  an optional input device (In), for instance a keyboard, that is configured to input data that will be stored in the memory (Mem), especially to enter the sample values x,
  an optional output device (Out), for instance a display device, that is configured to output data that is generated during the execution of the instructions, and
  a computer program product that calculates a transformed probability content ($\widetilde{pc}$) based on a truncation of a probability distribution function (306, 602) that is used to calculate at least one limit (UTBL, LTBL) of a tolerance interval (TI), especially transformed upper or lower tolerance band limit UTBL* or LTBL*.

There may be a connection/bus 410 between processor Pr and memory Mem. Further units of calculation unit 400 are not shown but are known to the person skilled in the art, for instance a power supply unit, an optional internet connection, etc. Alternatively, a server solution may be used that uses calculation power and/or memory space available on the internet supplied by other service providers or on an intranet of a company.

Figure 5:
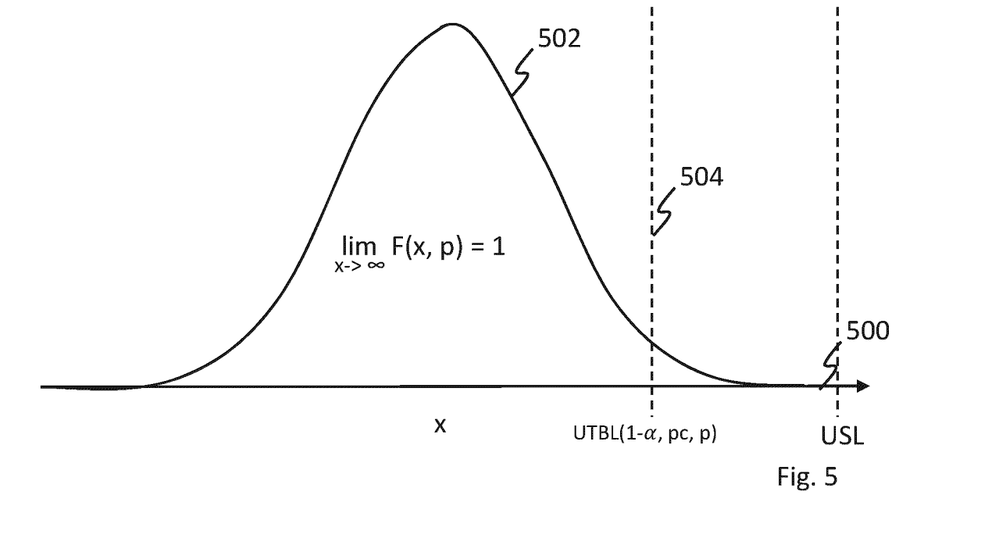
FIG. 5 illustrates the plot of a density function of a given distribution.

FIG. 5 illustrates the plot of a density function 502 of a given distribution with upper tolerance band limit UTBL and upper specification limit USL. X-axis 500 shows the value of sample values x. A y-axis is not shown but is used for displaying the frequency of the respective sample values x. In the example that is shown in FIG. 5 a normal probability distribution function 502 (density function) is used, i.e., a bell curve or a Gauss curve. The area below probability distribution function 502 is one. This is illustrated by a reference to the cumulate distribution function F(x, p), CDF of the normal probability distribution function 502, PDF. FIG. 5 shows an upper tolerance band limit 504, UTBL. A truncation is not considered for the calculation of upper tolerance band limit 504, UTBL using a confidence level of 1−α, a probability content or proportion pc and the vector p that contains the descriptive parameters of normal probability distribution function 502. This calculation is known to the person skilled in the art. Upper tolerance band limit 504 is below upper specification limit 506, USL. Thus, a decision could be made to start the production process of drug delivery devices 100. However, this decision may be wrong because a technical limit 308 has not been considered appropriately.

FIG. 6 illustrates the plot of the probability distribution function (density function) 602, for instance 306, of a given distribution with left truncation at $\xi_L$. The upper tolerance band limit UTBL is transformed to a transformed upper tolerance band limit UTBL* if a transformed probability content $\widetilde{pc}$ is used for the calculations. In the example transformed probability content $\widetilde{pc}$ is still smaller than upper specification limit USL. However, the distance between transformed upper tolerance band limit UTBL* and upper specification limit is reduced due to a shift of the transformed upper tolerance band limit UTBL* to the right if compared with upper tolerance band limit UTBL of FIG.

5, see delta 612. This is due to the consideration of the left truncation $\xi_L$. The decision to produce the drug delivery devices 100 is more reliable compared to the decision that is made based on FIG. 5.

FIG. 6 shows an x-axis 600 for the sample values x. A y-axis is not shown but relates to the frequency of the respective sample values. Normal probability distribution function 602 (density function), PDF approximates the histogram of a sample of drug delivery devices 100 a mentioned in the description of FIG. 3 or of other devices. A truncation threshold 604 corresponds to a technical limit TL, for instance to value zero, see also FIG. 3. An area 606 corresponds to a value of cumulative distribution function F at cutoff value $\xi_L$ or truncation value $\xi_L$. An area 608 corresponds to the remainder of cumulative distribution function F if the truncated area 606 is subtracted, i.e., to the value 1−F($\xi_L$, p).

Line 610 shows the location of a transformed upper tolerance band limit 610, UTBL* for the case in which a truncation of the probability distribution function 602 by a technical limit 308, i.e., at cutoff value $\xi_L$ is considered. A delta value 612 is shown especially large to make the displacement visible. Note that the displacement may also take place in the other direction, e.g., UTBL* may be smaller than UTBL, depending on the value of the cutoff value $\xi_L$. Line 614 shows an example of upper specification limit USL.

The transformed upper tolerance band limit 610, UTBL* is calculated based on a confidence level 1−α, a transformed probability content $\widehat{pc}$ and the descriptive parameter vector of probability density function 602. Transformed probability content $\widehat{pc}$ is calculated according to formulas (1) and (2) that are also described below. An intermediate step for the calculation of transformed upper tolerance band limit 610, UTBL* is the calculation of a transformed tolerance limit factor $\hat{k}$ according to formula (5) that is described below.

The transformed upper tolerance band limit UTBL* may be calculated according to:

$$\text{UTBL}^* = \bar{x} + \hat{k}^* s,$$

where $\bar{x}$ is the mean value of sample values x and s is the standard deviation of the sample values s. The calculation of the mean value and of the standard deviation is known from basic statistics books.

Corresponding calculations may be made if there is a right side truncation of a probability distribution function. In this case, a transformed lower tolerance band limit LTBL* may be calculated according to:

$$\text{LTBL}^* = \bar{x} - \hat{k}^* s,$$

where $\bar{x}$ is the mean value of sample values x and s is the standard deviation of the sample values s. The calculation of the mean value and of the standard deviation is known from basic statistics books.

Spoken with other words and in addition to the description of FIGS. 1 to 6 above, in statistics, a truncated distribution is a conditional distribution that results from restricting the domain of some other probability distribution. Truncated distributions arise in practical statistics in cases, where for some reason, the range of values is limited to values which lie above or below a given threshold or within a specified range. For example, if the force of removing the cap 112 of a device 100 is measured, this would be subject to truncation because the force can only be positive.

Thus, several device-related features have to be evaluated, which are subject to truncation. For example the expelled volume of a pen device 100 is always non-negative. Thus, the dose accuracy distribution is left-truncated at threshold $\xi_L$0. In practice the truncation of features can often be neglected as actually considered values are sufficiently far away from the according truncation threshold, such that the influence on derived statistics is not significant. However in some cases a significance may arise.

It may be defined that in verification testing a statistical tolerance interval TI shall be calculated according to ISO 16269-6 (statistical Interpretation of data—Part 6: Determination of statistical tolerance intervals, 2014 (E), or an earlier or later version thereof) and compared to the specification range S, where truncation due to physical limits may be treated as one limit of the specification range. The acceptance criterion is that the tolerance interval TI is part or is identical to the specification range S. A plot of the density function of the normal distribution or of another given distribution with upper tolerance band limit UTBL and upper specification limit USL (Upper Specification Limit) is diagrammatically shown in FIG. 5. In that case we have UTBL≤USL, i.e., tolerance interval TI is part or is identical to specification limit S. Thus the acceptance criterion is met.

In certain cases it may occur that one tolerance band limit may exceed the according physical limit, though it is known that the physical limit can never be exceeded in practice. In that case that violation may be rated as being practically not existent. However, there may be an impact on the other side of the tolerance band and this impact may be treated adequately. It is noted that this case is different from the case that is named as censoring, i.e., in which values below or above a threshold cannot be observed due to technical or physical limits or properties of the measurement system although these values exist practically and theoretically. The proposed methods should not be applied to "censoring" because there may be other calculations applied.

The following formulas are given to ease the understanding of the invention. However, the invention should not be bound to this theory or to another theory. Values of a given feature may be statistically distributed with a given density function f or probability distribution function PDF that may be a mapping of real numbers, e.g., sample values x, to the interval of 0 to 1, especially comprising also the limits of the interval. This may be expressed as: $f(\bullet; p): R \to [0; 1]$ with parameter vector p element of $R^n$, where n is the dimension of the parameter space. Typically we have n=2 for distributions used for instance for medical devices 100 or other types of devices. For example, in case of the normal distribution the parameter vector p is $p = [\mu; \sigma^2]^T$, where "μ" is the expected value (mean value) and $\sigma^2$, i.e., the square of the standard deviation σ, is the variance $\sigma^2$. T means the transposed of the vector.

The corresponding distribution function or cumulative distribution function CDF is:

$$f(\bullet; p): R \to [0; 1],$$

where "•" is a place holder, with:

$$F(a, p) = \int_{-\infty}^{a} f(x, p) dx,$$

wherein "a" is a special value of a device feature.

Furthermore, it may be valid:

$$\int_R f(\bullet, p) = 1,$$

if integrated over the whole definition ranges of $R^n$, i.e. the n dimensional space of real numbers, wherein n is a natural number greater or equal 1.

According to the standard ISO 16269-6:2014(E), introduction, first sentence: "A statistical tolerance interval is an estimated interval, based on a sample, which can be asserted with confidence level 1−α, for example 0.95, to contain at least a specified proportion p of the items in the population." This definition of the statistical tolerance interval TI is also used in this application. The specified portion p is named as probability content pc in this application.

The standard ISO 16269-6:2014(E) discloses possibilities to calculate tolerance intervals TI, especially lower and upper tolerance interval limits. However, truncation is not considered.

Without loss of generality, in the following, the case of a left-truncation is considered, see FIG. 6 that illustrates a plot of the density of a given distribution function 602 with left truncation at $\xi_L$. This means that a $\xi_L$ exists with $\xi_L$ element of R such that the probability content of $F(\xi_L, p)$—this is the portion left to the truncation—does practically not exist. The upper tolerance band limit UTBL is transformed according to a transformed probability content $\widehat{pc}$ to a transformed upper tolerance band limit UTBL*. Furthermore, an upper specification limit USL is shown.

This means that there exists a element of R such that a probability content pc of $F(\xi_L; p)$, i.e., the portion 606 left to the truncation $\xi_L$, does practically not exist because there may be a technical limit 308 for the variable x under investigation as stated above.

The upper tolerance band limit UTBL indicates that a certain probability content pc lies within the according tolerance interval TI. In the case in which the portion $F(\xi_L; p)$ of practically not relevant probability content pc is however significant, the upper tolerance band limit UTBL may need some transformation to reflect that truncation of the cumulative density function CDF.

As described above, the required probability content pc may need to be transformed ($\widehat{pc} = T_L(pc)$), as diagrammatically shown in FIG. 6, wherein $T_L$ is a transformation function that is valid for left truncation.

In a first step we may calculate an actual probability content $pc_{act}$ or an actual probability content $pc_{act}$ which is covered by the tolerance interval TI, e.g., it may be corrected by subtraction of the according portion 606 due to the truncation $\xi_L$. More specifically the actual probability content $pc_{act}$ may be computed by a linear transformation of the desired probability content. The truncated portion 606, see left part in FIG. 6, of the distribution function 602 may be subtracted from the desired probability content pc. A normalization may be made by dividing by the remaining portion 608 of the distribution, see right part in FIG. 6.

$$pc_{act} = (pc - F(\xi_L; p))/(1 - F(\xi_L; p)) \quad \text{formula (1)}$$

However, other formulas may also be used to determine the actual probability content $pc_{act}$.

In a second step the difference between the specified/required probability content pc and the actual probability content $pc_{act}$ may be added to the required probability content pc in order to get the transformed probability content $\widehat{pc}$:

$$\widehat{pc} = T_L(pc) = pc + (pc - pc_{act}) \quad \text{formula (1b)}$$

However, other formulas may also be used as transform function $T_L(pc)$. The following holds with the transform function $T_L(pc) = pc + (pc - pc_{act})$ using formula (1):

$$\widehat{pc} = 2pc - (pc - F(\xi_L, p))/(1 - F(\xi_L, p)) \quad \text{formula (2)}$$

$$\widehat{pc} = \left(2 - \frac{1}{1 - F(\xi_L, p)}\right) * pc + \frac{F(\xi_L, p)}{1 - F(\xi_L, p)} =$$

$$(2 - 1/(1 - F(\xi_L, p))^* pc + F(\xi_L, p)/(1 - F(\xi_L, p))$$

Thus, the transformation of the desired probability content pc may be a linear function of the desired probability content pc and the truncated portion 606 of the distribution 602. The area of the truncated portion 606 may depend on the truncation threshold $\xi_L$ in a non-linear way.

In case of right truncation at $\xi_R$ element of $R^n$ the according transformation of the probability content is:

$$\widehat{pc} = \left(2 - \frac{1}{1 - F(\xi_R, p)}\right) * pc + \frac{1 - F(\xi_R, p)}{F(\xi_R, p)} \quad \text{formula (3)}$$

$$= T_R(pc) = pc(2 - 1/(1 - F(\xi_R, p)) + (1 - F(\xi_R, p))/F(\xi_R, p) \quad \text{formula (3)}$$

Derivation of the formula for right truncation is a further term conversion and directly analogous to the case of left truncation, see formula for $p_{act}$ and right truncation in the introduction part of the description.

Example: Let's assume, a force feature of a pen device 100 is tested and the distribution of the sample values x is known to be normally distributed. For that feature a USL of 40 N (Newton) is defined. It is known that the force cannot be below $\xi_L$=0 N due to physical properties. The acceptance criterion for testing may be that at least a probability content of pc=97.5% lies within the specification limits at a confidence level of 1−α=95%. A test of 20 samples results in a mean value of $\bar{x}$=9.13 N and an estimated standard deviation of s=5.97 N. A two-sided tolerance interval without considering the truncation is calculated by x+/−k*s for getting the tolerance band limits, where k=3.154 is the tolerance limit factor for the given conditions. This leads to a tolerance interval of TI=[−9.70; 27.96] N. In that case the lower tolerance band limit LTBL is below the truncation threshold $\xi_L$.

In order to treat that truncation issue correctly, the approach derived above may be used. Using formula (2) the required probability content is transformed to:

$$\widehat{pc} = \left(2 - 1/(1 - F(\xi_L, p))pc + F(\xi_L, p)/(1 - F(\xi_L, p))\right) = \quad \text{formula (4)}$$

$$\left(2 - 1/\left(1 - F(0;[9.13; 5.972]^T)\right)0.975 + \right.$$

$$F([9.13; 5.972]^T)/\left(1 - F([9.13; 5.972]^T)\right),$$

with $F(0;[9.13; 5.972]^T) = \frac{1}{5.97 * \sqrt{2 * PI}} \int_{-\infty}^{0} e^{-\frac{1}{2}\left(\frac{x-9.13}{5.97}\right)^2}$ $dx(1/(5.97 * sqrt(2 * PI) * $ integral from − infinity (∞)

to 0 over $\exp(-1/2 * ((x - 9.13)/(5.97))^2 dx) = 0.06$ wherein PI=3, 24 . . . , sqrt( ) is the square root function and exp is the exponential function.

And furthermore using formula (2):

$$\widehat{pc} = 0.975 * (2 - 1/(1 - 0.06) + 0.06/(1 - 0.06) = 0.977$$

In a third step the according tolerance limit factor $\hat{k}$ for $\widehat{pc}$ is determined, i.e. $\hat{k}=2.847$. Standard statistical software packages may be used to calculate $\hat{k}$. However, transformed probability content $\widehat{pc}$ has to be used instead of specified probability content pc that is suggested by standard statistical software packages.

In a fourth step the resulting tolerance interval is calculated, i.e. I=[0; 26.12] N. The upper limit is also below the upper specification limit USL of 40 N. Thus, the acceptance criterion is met.

$\hat{k}$ may be calculated using software packages available on the market. It is possible to use the software R, especially the package tolerance intervals TI, see "An R package for Estimating Tolerance Intervals", Derek S. Young, Journal of Statistical Software, August 2010, Volume 36, Issue 5, page 1 to 39, especially section 4.8. (Univariate) normal tolerance intervals. The relevant function may be:
K.factor(n, f=NULL, alpha=0.05, P=0.99, side=1, method=c ("HE", "HE2", "WBE", "ELL", "KM", "EXACT", "OCT"), m=50), However $\widehat{pc}$ may be used instead pc for the value P of the function. A one side setting may be used, i.e. side=1.

The article of Derek S. Young mentions that there is an exact solution for k in the case of a one sided setting:

$$k=1/\mathrm{sqrt}(n)t^*_{n-1;1-alpha}(\mathrm{sqrt}(n)z_P) \quad \text{formula (5)}$$

such that n is the sample size, $t^*_{n-1;1-alpha}$(delta) is the (1−α)-th quantile of a non-central t distribution with d degrees of freedom, e.g., n−1, and non-centrality parameter delta, and $z_P$ is the P-th percentile of the standard normal distribution. Alternatively, the exact solution may also be calculated by numerical integration. However, the numerical effort, i.e., processor power, may be much larger compared to the usage of the analytical exact solution.

The significance of the truncation may be evaluated for instance according to the following rule of Barbara Bredner in "Prozessfaehigkeit bewerten, Kennzahlen fuer nomalverteilte und nicht-normalverteilte Merkmale", Jun. 11, 2014, http://www.drsteuer.de/vorlagen/Prozessfaehigkeit_bewerten_Nov_14.pdf (visited May 16, 2019) and "Prozessfaehigkeit bei technisch begrenzten Merkmalen, Faehigkeitskennzahlen und Berechnungsmethoden", Jan. 15, 2015, URL: https://www.bb-sbl.de/wp-content/uploads/2018/08/BB-SBL-Prozessf%C3%A4higkeit-bewerten-V13-2015-01-15.pdf (visited May 20, 2013). It is proposed that a truncation is relevant in case $|\bar{x}-\xi|$ smaller or equal 3 s, where $\bar{x}$ is the samples mean, $\xi$ is the truncation threshold $\xi_L$ or $\xi_R$ and "s" is the samples estimated standard deviation.

A further step may be the analysis of process capability for truncated distributions which is described for instance in Barbara Bredner, "Prozessfaehigkeit bei technisch begrenzten Merkmalen, Faehigkeitskennzahlen and Berechnungsmethoden", Jan. 15, 2015, URL: https://www.bb-sbl.de/wp-content/uploads/2018/08/BB-SBL-Prozessf%C3%A4higkeit-bewerten-V13-2015-01-15.pdf (visited May 20, 2019).

In summary, a transformation of the required probability content in case of a truncated distribution is disclosed. In case of left-truncation the probability content should be transformed according to formula (2) or a similar/corresponding formula. In case of right-truncation the probability content should be transformed according to formula (3) or a similar/corresponding formula.

It is also possible to transfer the given technical teaching to other distributions than normal distributions, for instance to log normal, Weibull, Gumbel, Fréchet distribution functions, etc.

Although embodiments of the present disclosure and their advantages have been described in detail, it should be understood that various changes, substitutions and alterations can be made therein without departing from the spirit and scope of the disclosure as defined by the appended claims. For example, it will be readily understood by those skilled in the art that many of the features, functions, processes and methods described herein may be varied while remaining within the scope of the present disclosure. Moreover, the scope of the present application is not intended to be limited to the particular embodiments of the system, process, manufacture, method or steps described in the present disclosure. As one of ordinary skill in the art will readily appreciate from the disclosure of the present disclosure, systems, processes, manufacture, methods or steps presently existing or to be developed later that perform substantially the same function or achieve substantially the same result as the corresponding embodiments described herein may be utilized according to the present disclosure. Accordingly, the appended claims are intended to include within their scope such systems, processes, methods or steps. The embodiments mentioned in the first part of the description may be combined with each other. The embodiments of the description of FIGS. 1 to 6 may also be combined with each other. Further, it is possible to combine embodiments mentioned in the first part of the description with examples of the second part of the description which relates to FIGS. 1 to 6.

LIST OF REFERENCE NUMERALS 100 drug delivery device
101 container retaining member
102 main housing part
104 piston rod
106 driving mechanism
108 actuating element
110 needle
112 cap
200 test setup device
201 mounting arrangement
202 upper clamp device
204 lower clamp device
206 control device
208 measurement reporting device
300 x-axis
302 y-axis
304 column representing one class of force values
306 normal probability distribution function
308 truncation threshold
310 upper tolerance band limit UTBL
312 calculated lower tolerance band limit LTBL
400 calculating device
410 connection
Pr processor
Mem memory
In input device
Out output device
500 x-axis
502 normal probability distribution function
504 upper tolerance band limit UTBL
506 upper specification limit USL
600 x-axis 602 normal probability distribution function
604 truncation threshold
606 area that corresponds to the value of cumulative distribution function F
608 area that corresponds to the remainder of cumulative distribution function F
610 upper tolerance band limit UTBL
612 delta value
614 upper specification limit USL
TL technical limit
CDF Cumulative Distribution Function
PDF Probability Distribution Function
x variable under test
X set of values for x
s, $\sigma$ a standard deviation of X
$\sigma^2$ variance (small Greek letter Sigma)
$\mu$ expected value (small Greek letter My)
S specification range
TI Tolerance Interval
DE Device Evaluation,
USL Upper Specification Limit
UTBL Upper Tolerance Band Limit
UTBL* transformed Upper Tolerance Band Limit
LSL Lower Specification Limit
LTBL Upper Tolerance Band Limit
$1-\alpha$ confidence level (1–small Greek letter Alpha)
$F(\bullet; p)$ cumulative distribution function with parameter vector p
$f(\bullet; p)$ probability distribution function with parameter vector p (density function)
k tolerance limit factor
$\hat{k}$ transformed tolerance limit factor
pc probability content
$\widehat{pc}$ transformed probability content
R real Numbers
$x^T$ vector x transposed
$\bar{x}$ mean of x
$\xi$ general truncation threshold (small Greek letter Ξ)
$\xi_L$ left truncation threshold
$\xi_R$ right truncation threshold
N newton, unit of force

The invention claimed is:

1. A method comprising:
providing a plurality of sample values, wherein the sample values fluctuate and define a sample value distribution, the sample values being values of a technical parameter related to sample items of a sample, wherein the sample items are parts of drug delivery devices, assemblies for drug delivery devices, or drug delivery devices, wherein the sample items are of the same construction, and wherein the technical parameter is limited by at least one technical limit value,
depending on the sample values, choosing a probability distribution function,
using the technical limit value to determine a cutoff value for the probability distribution function,
specifying a probability content for a tolerance interval, wherein a confidence level $1-\alpha$ is used that specifies the probability that the tolerance interval that has to be estimated for the technical parameter will contain values of the technical parameters of at least a proportion of production items that is specified by the probability content,
wherein the value of $1-\alpha$ is the confidence level, and wherein $\alpha$ is the statistical significance, and
providing at least one limit of the tolerance interval for the technical parameter based on a transformed probability content, wherein said transformed probability content is based on the cutoff value and based on the specified probability content,
using the at least one limit of the tolerance interval to manufacture the drug delivery devices or the parts of drug delivery devices or the assemblies for drug delivery devices.

2. The method according to claim 1, wherein the specified probability content refers to the proportion or percentage of a total number of the production items, wherein the production items are parts of drug delivery devices, assemblies for drug delivery devices, or drug delivery devices of the same construction as the sample items,
wherein the total number of production items has been produced or will be produced and is greater than a size of the sample from which the sample values have been taken by at least a factor of 10, of 100 or of 1000.

3. The method according to claim 1, wherein at least one descriptive parameter or at least two descriptive parameters of the sample values are calculated,
wherein the at least one descriptive parameter is used or wherein the at least two descriptive parameters are used to calculate the cutoff value of the probability distribution function.

4. The method according to claim 1, wherein the technical parameter is one of the following drug delivery device parameters:
dose accuracy, dial torque, dispense force, cap attachment force, cap removal force, needle shield removal force, injection time, activation force, blocking distance of a needle cover, needle extension, expelled volume, assembly force.

5. The method according to claim 1, wherein
the at least one limit of the tolerance interval is an upper limit that is compared with an upper specification limit for the sample items in order to evaluate a production process, or
wherein the at least one limit is a lower limit that is compared with a lower specification limit for the sample items in order to evaluate a production process.

6. The method according to claim 1, wherein the transformed probability content is calculated using the specified probability content and a value that is determined by or equal to an area of a truncated part of the probability distribution function or determined by or equal to the value of a cumulative distribution function of the probability distribution function considering the cutoff value,
wherein the truncated part is within a range that starts at minus infinity or at a corresponding value and that ends at the cutoff value or within a range that begins at the cutoff value and that ends at plus infinity or at a corresponding value.

7. The method according to claim 6, wherein an actual probability content is calculated using the specified probability content, the cumulative distribution function of the probability distribution function, and the cutoff value.

8. The method according to claim 7, wherein the transformed probability content is calculated by calculating a sum of the specified probability content and of a difference between the specified probability content and the actual probability content.

9. The method according to claim 7, wherein the transformed probability content is calculated using the specified probability content and the actual probability content.

10. The method according to claim 9, wherein the transformed probability content is used to calculate a tolerance limit factor that is used to calculate the at least one limit of the tolerance interval by using also at least one of the descriptive parameters of the probability distribution function.

11. The method according to claim 10, wherein the tolerance limit factor is calculated for a one sided setting.

12. The method according to claim 11, wherein the tolerance limit factor is calculated according to:

$$K\_hat=1/sqrt(n)t^*\_n-1;1\text{-alpha}(sqrt(n)zP),$$

wherein n is a natural number indicating the sample size, to_n−1; 1-alpha is the (1-α)-th quantile of a non-central t distribution with d degrees of freedom and non-centrality parameter delta, and zP is the P-th percentile of the standard normal distribution, wherein the transformed probability content is used for P, and sqrt ( ) is the square root function.

13. The method according to claim 1, wherein ISO 11608-1 Needle based injection systems for medical use—Requirements and test methods—Part 1 Needle based injection systems, 2014 or an earlier or later version thereof is met with regard to the calculation of the at least one limit of the tolerance interval.

14. A method for determining a limit of a tolerance interval, wherein a test is performed whether it is necessary to calculate a transformed probability content,
and wherein the method according to claim 1 is performed if a test equation is fulfilled,
and wherein the specified probability content is used for the calculation of the at least one limit of the tolerance interval but not the transformed probability content if the test equation is not fulfilled.

15. A method for evaluating a production process, comprising the method according to claim 1,
wherein the at least one limit of the tolerance interval is compared with a limit of a specification interval for production items that have the same construction as the sample items.

16. A non-transitory computer readable medium encoded with a computer program product, which, when executed on a controller or on a processor, carries out the following method steps:
providing a plurality of sample values, wherein the sample values fluctuate and define a sample value distribution, the sample values being values of a technical parameter related to sample items of a sample, wherein the sample items are parts of drug delivery devices, assemblies for drug delivery devices, or drug delivery devices, wherein the sample items are of the same construction, and wherein the technical parameter is limited by at least one technical limit value,
depending on the sample values, choosing a probability distribution function,
using the technical limit value to determine a cutoff value for the probability distribution function,
specifying a probability content for a tolerance interval, wherein a confidence level 1-α is used that specifies the probability that the tolerance interval that has to be estimated for the technical parameter will contain values of the technical parameters of at least a proportion of production items that is specified by the probability content,
wherein the value 1-α is the confidence level, and wherein α is the statistical significance, and
providing at least one limit of the tolerance interval for the technical parameter based on a transformed probability content, wherein said transformed probability content is based on the cutoff value and based on the specified probability content,
using at least one limit of the tolerance interval to manufacture the drug delivery devices or the parts of drug delivery devices or the assemblies for drug delivery devices.

17. The non-transitory computer readable medium of claim 16, wherein the transformed probability content is calculated using the specified probability content and a value that is determined by or equal to an area of a truncated part of the probability distribution function or determined by or equal to the value of a cumulative distribution function of the probability distribution function considering the cutoff value,
wherein the truncated part is within a range that starts at minus infinity or at a corresponding value and that ends at the cutoff value or within a range that begins at the cutoff value and that ends at plus infinity or at a corresponding value.

18. The non-transitory computer readable medium of claim 16, wherein at least one descriptive parameter or at least two descriptive parameters of the sample values are calculated,
wherein at least one descriptive parameter is used or wherein at least two descriptive parameters are used to calculate the cutoff value of the probability distribution function.

19. The non-transitory computer readable medium of claim 16, wherein
at least one limit of the tolerance interval is an upper limit that is compared with an upper specification limit for the sample items in order to evaluate a production process, or
wherein at least one limit is a lower limit that is compared with a lower specification limit for the sample items in order to evaluate a production process.

20. A calculation device, comprising:
a processor configured to execute instructions,
a memory that is configured to store the instructions and to store data that is used or generated during the execution of the instructions, and
the non-transitory computer readable medium according to claim 16.

* * * * *